(12) United States Patent
Caillot et al.

(10) Patent No.: US 9,809,202 B2
(45) Date of Patent: Nov. 7, 2017

(54) MOTOR VEHICLE WINDSCREEN WIPER WINDSCREEN WASHER LIQUID DISTRIBUTION SYSTEM

(71) Applicant: Valeo Systèmes d'Essuyage, Le Mesnil Saint Denis (FR)

(72) Inventors: Gérald Caillot, Cernay La Ville (FR); Jean-Michel Jarasson, Le Mesnil-St-Denis (FR); Vincent Izabel, Chilly Mazarin (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 96 days.

(21) Appl. No.: 14/212,463

(22) Filed: Mar. 14, 2014

(65) Prior Publication Data

US 2014/0259503 A1     Sep. 18, 2014

(30) Foreign Application Priority Data

Mar. 14, 2013   (FR) ...................................... 13 52250

(51) Int. Cl.
*B60S 1/48*     (2006.01)
*F16L 53/00*    (2006.01)
(Continued)

(52) U.S. Cl.
CPC ............... *B60S 1/487* (2013.01); *B60S 1/488* (2013.01); *B60S 1/50* (2013.01); *B60S 1/52* (2013.01);
(Continued)

(58) Field of Classification Search
CPC ......... Y10T 137/6416; Y10T 137/6606; Y10T 137/87153; B60S 1/487; B60S 1/52;
(Continued)

(56) References Cited

U.S. PATENT DOCUMENTS 2,440,923 A * 5/1948 Bell ...................... B60S 1/3805
                                                           15/250.07
3,888,412 A * 6/1975 Lindo .................... B60S 1/487
                                                           137/599.14
(Continued)

FOREIGN PATENT DOCUMENTS

CN        101980900 A     2/2011
CN        102203518 A     9/2011
(Continued)

OTHER PUBLICATIONS

The First Office Action issued in corresponding Chinese Patent Application No. 201410109737.7, dated Mar. 9, 2017 (23 pages).

*Primary Examiner* — Mary McManmon
*Assistant Examiner* — David Colon Morales
(74) *Attorney, Agent, or Firm* — Osha Liang LLP

(57) ABSTRACT

A motor vehicle windscreen wiper windscreen washer liquid distribution system including a windscreen washer liquid distribution network is disclosed. The windscreen washer liquid distribution network includes at least one hydraulic pipe including at least one windscreen washer liquid circulation passage, at least one hydraulic connector connected to the circulation passage, and at least one thermally conductive member in thermal contact with the at least one hydraulic connector and with a heating element of the distribution system.

18 Claims, 8 Drawing Sheets

Figure 10:
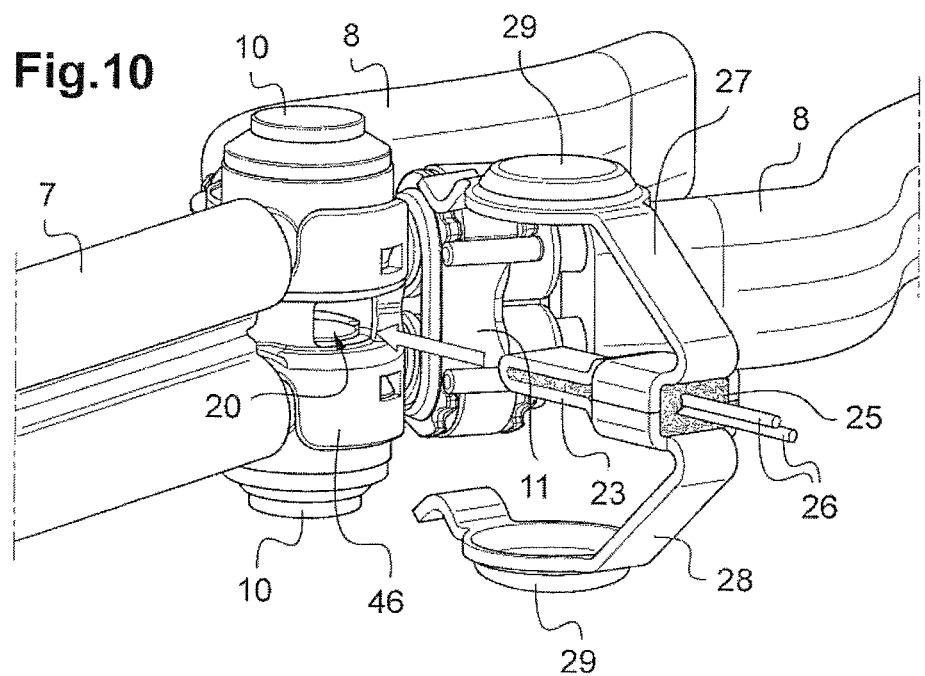

(51) Int. Cl.
 *B60S 1/52* (2006.01)
 *B60S 1/50* (2006.01)
 *B60S 1/38* (2006.01)

(52) U.S. Cl.
 CPC ............. *B60S 1/524* (2013.01); *F16L 53/008* (2013.01); *B60S 1/3862* (2013.01); *B60S 1/482* (2013.01)

(58) Field of Classification Search
 CPC .. B60S 1/50; B60S 1/488; B60S 1/524; B60S 1/482; B60S 1/3862; B60S 1/46; B60S 1/48; F16L 53/008; B05B 1/3006
 USPC ........ 138/33; 285/41; 15/250.05; 239/284.1, 239/570–571
 See application file for complete search history.

(56) References Cited

U.S. PATENT DOCUMENTS

| | | | | |
|---|---|---|---|---|
| 4,145,788 A * | 3/1979 | Ferrarelli | ............ | B60S 1/0402 15/250.05 |
| 4,152,577 A * | 5/1979 | Leavines | ............... | F16L 53/008 137/341 |
| 4,212,425 A * | 7/1980 | Schlick | ..................... | B05B 1/24 137/341 |
| 4,281,238 A * | 7/1981 | Noma | ..................... | H05B 3/58 138/33 |
| 4,329,569 A * | 5/1982 | Hjortsberg | ............... | H05B 3/16 138/33 |
| 4,360,158 A * | 11/1982 | Bauer | ..................... | B60S 1/48 239/284.1 |
| 4,520,961 A * | 6/1985 | Hueber | ..................... | B60S 1/52 239/284.1 |
| 4,815,769 A * | 3/1989 | Hopperdietzel | .......... | B05B 1/24 138/33 |
| 4,838,488 A * | 6/1989 | Heier | ..................... | B60S 1/481 137/594 |
| 5,195,206 A * | 3/1993 | Bauer | ................... | B60S 1/3415 137/580 |
| 5,819,360 A * | 10/1998 | Fujii | ....................... | B60S 1/482 15/250.04 |
| 6,029,908 A * | 2/2000 | Petzold | ................... | B60S 1/488 239/128 |
| 6,060,691 A * | 5/2000 | Minami | ................ | F16K 49/002 137/341 |
| 6,155,299 A * | 12/2000 | Martin | ..................... | B60S 1/52 137/846 |
| 6,230,745 B1 * | 5/2001 | Brooks | ..................... | E03B 7/14 138/33 |
| 6,402,052 B1 * | 6/2002 | Murawa | ................ | B05B 1/3006 239/284.1 |
| 6,460,780 B1 * | 10/2002 | Zimmer | .................... | B60S 1/52 239/284.1 |
| 6,501,907 B1 * | 12/2002 | Rehs | .......................... | B60S 1/52 239/133 |
| 6,507,973 B1 * | 1/2003 | Friesen | ................ | B60S 1/3805 15/250.05 |
| 6,754,933 B1 * | 6/2004 | Pettersson | ............. | B60S 1/3805 15/250.07 |
| 6,912,357 B2 * | 6/2005 | Bissonnette | ............. | B05B 1/24 137/341 |
| 7,263,984 B2 * | 9/2007 | Wade | ................. | F01M 13/0011 123/572 |
| 7,311,268 B2 * | 12/2007 | Sporer | ..................... | B60S 1/52 239/128 |
| 7,387,114 B2 * | 6/2008 | Gschwind | ............. | F01M 13/00 123/573 |
| 7,991,273 B2 * | 8/2011 | Sonderegger | ......... | F16L 53/008 392/465 |
| 8,075,020 B2 * | 12/2011 | Colosimo | ............ | F01N 3/2066 174/47 |
| 8,291,939 B2 * | 10/2012 | Ferrone | .................. | A01K 7/027 138/104 |
| 2003/0089409 A1* | 5/2003 | Morimoto | ................. | B60S 1/52 137/859 |
| 2004/0188541 A1* | 9/2004 | Maruyama | .............. | B60S 1/481 239/284.1 |
| 2006/0054224 A1* | 3/2006 | Lasebnick | ............. | B05B 1/3006 137/625.48 |
| 2007/0257026 A1* | 11/2007 | Tanaka | .................... | F16L 37/12 219/535 |
| 2010/0307622 A1* | 12/2010 | Lee | .......................... | F16L 11/12 138/33 |
| 2011/0185531 A1* | 8/2011 | Egner-Walter | .......... | B60S 1/381 15/250.01 |
| 2011/0197384 A1* | 8/2011 | Grandjean | ............. | B60S 1/488 15/250.01 |
| 2011/0248494 A1* | 10/2011 | Rosenfeldt | ............. | B29C 65/16 285/41 |
| 2012/0125913 A1* | 5/2012 | Song | ..................... | F16L 53/008 219/546 |
| 2012/0167327 A1* | 7/2012 | Kasack | .................... | B60S 1/488 15/250.04 |
| 2012/0255163 A1* | 10/2012 | Stein | ..................... | F16L 53/008 29/650 |

FOREIGN PATENT DOCUMENTS

| | | | | |
|---|---|---|---|---|
| CN | 102481901 A | | 5/2012 | |
| FR | 2804395 A1 * | | 8/2001 | ............. B60S 1/488 |

* cited by examiner

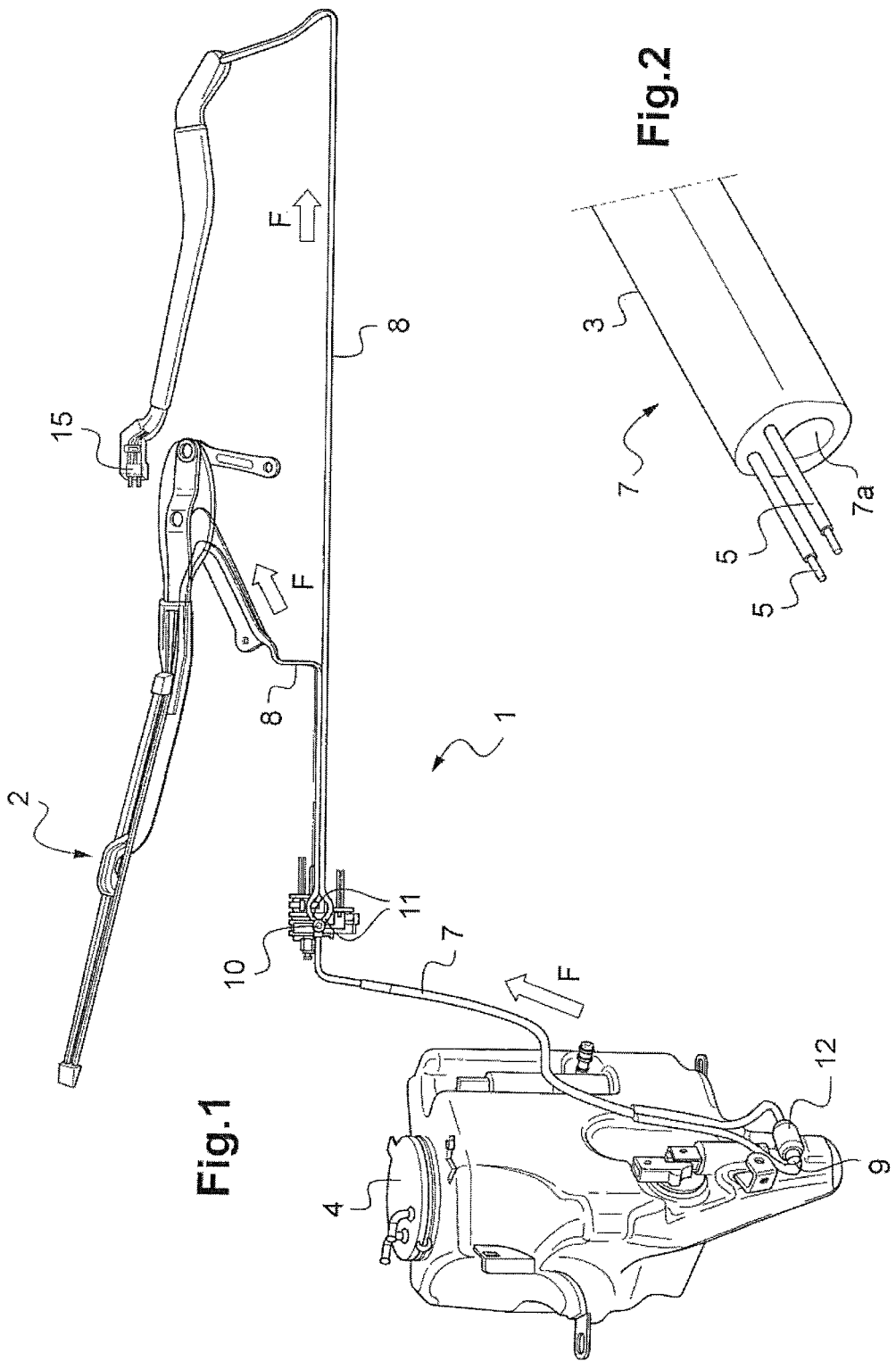

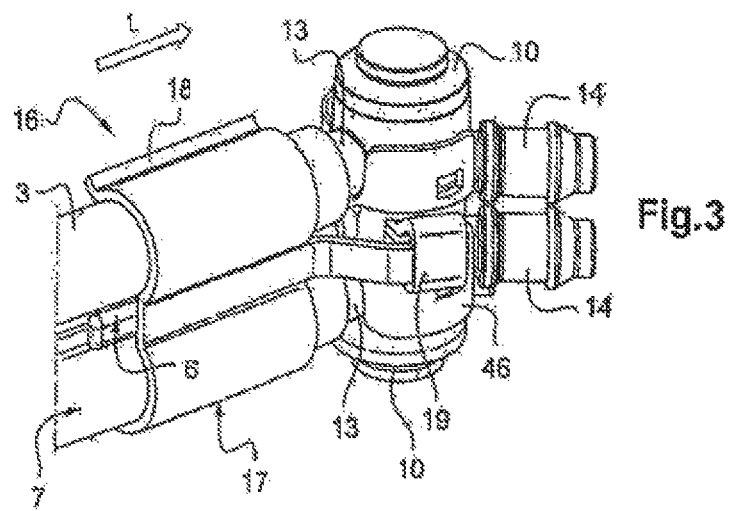
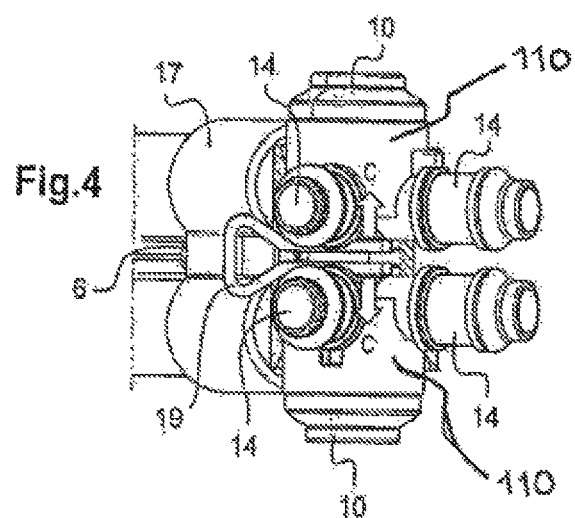
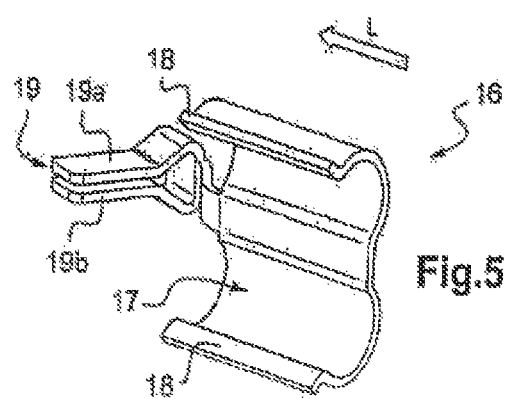

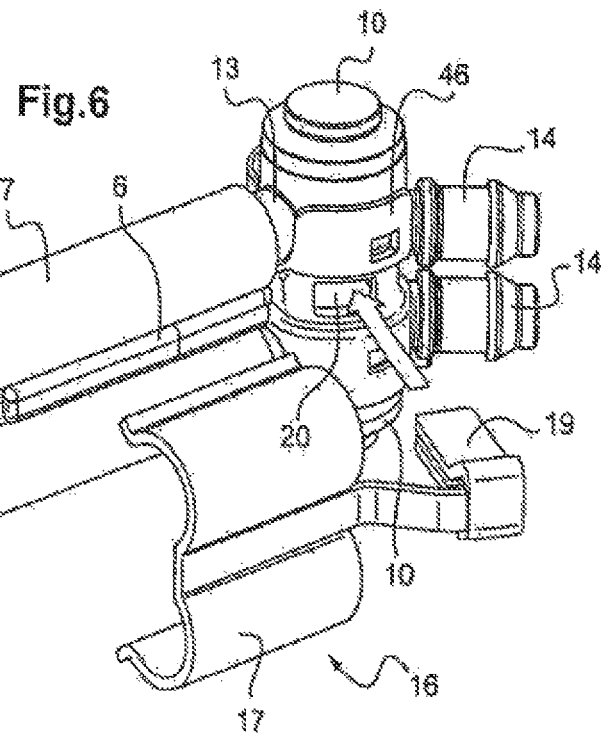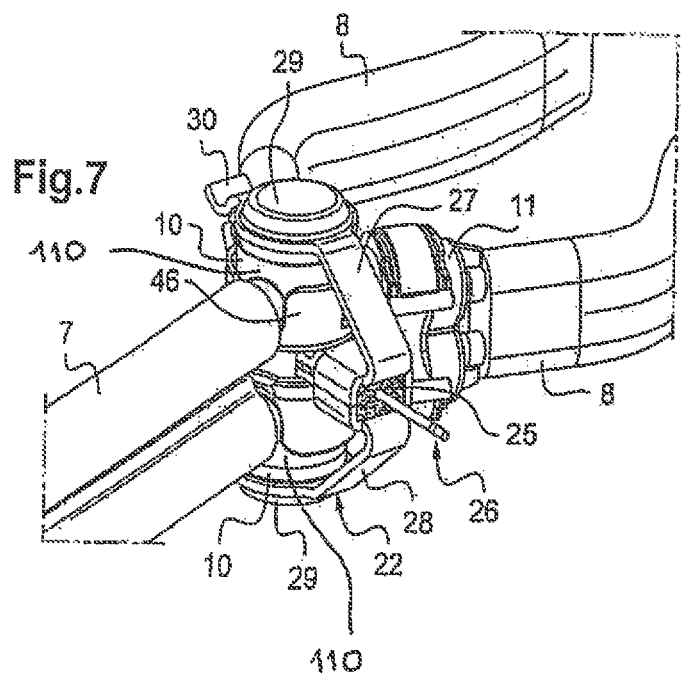

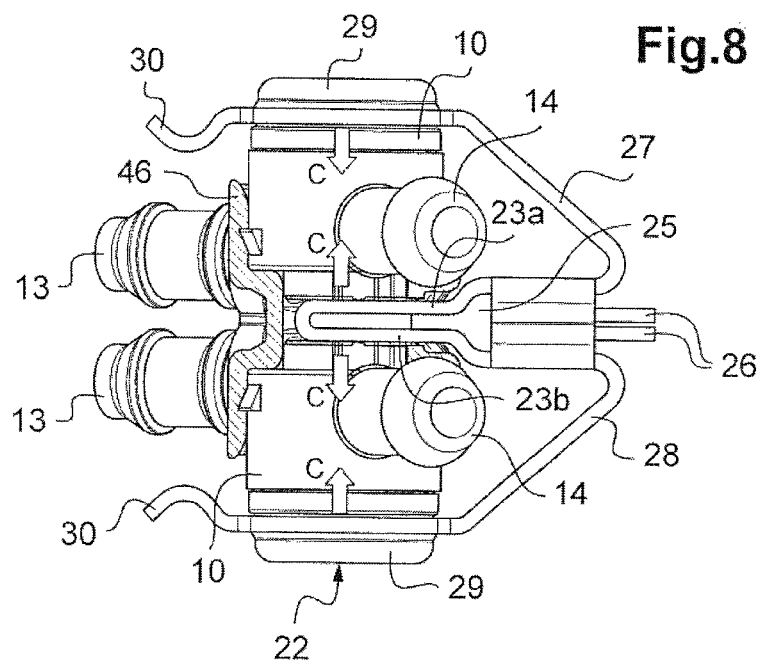
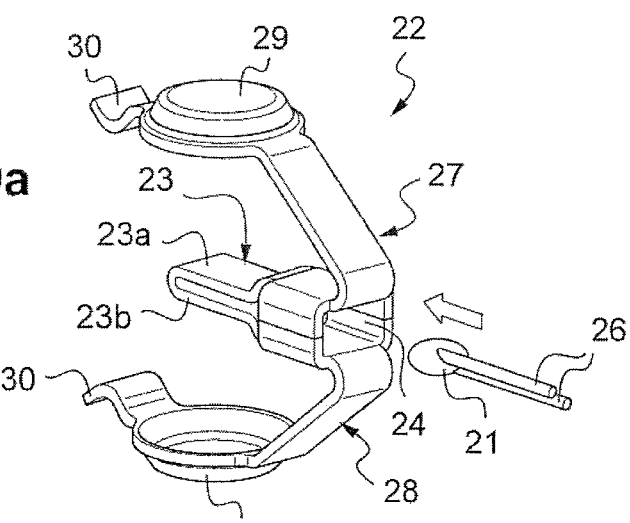
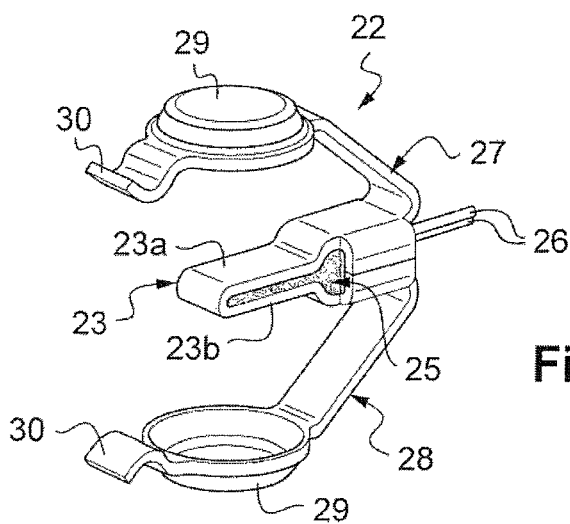

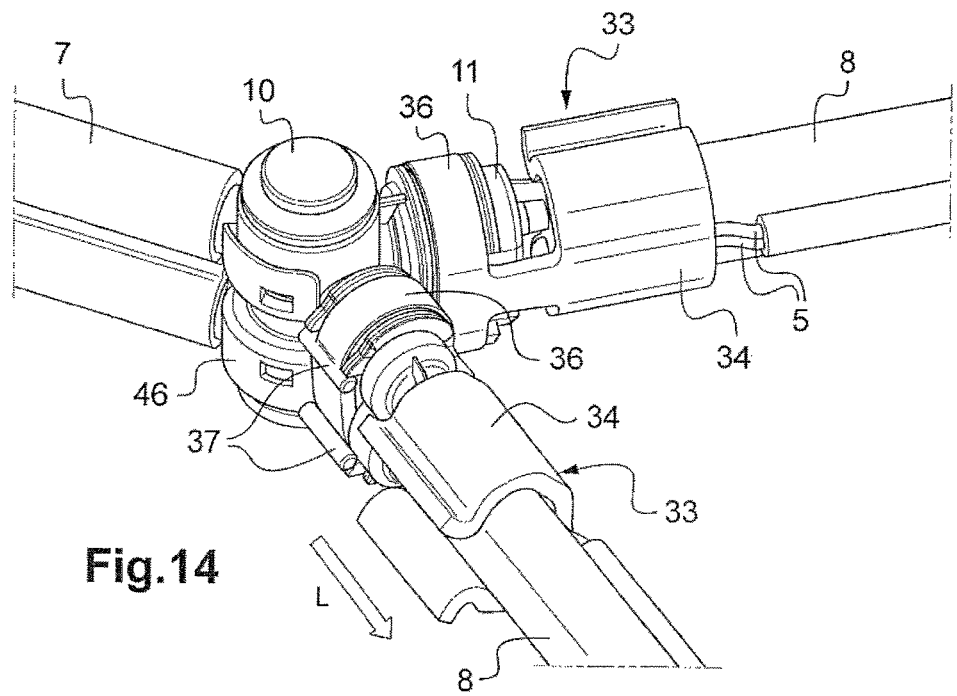
Fig.14
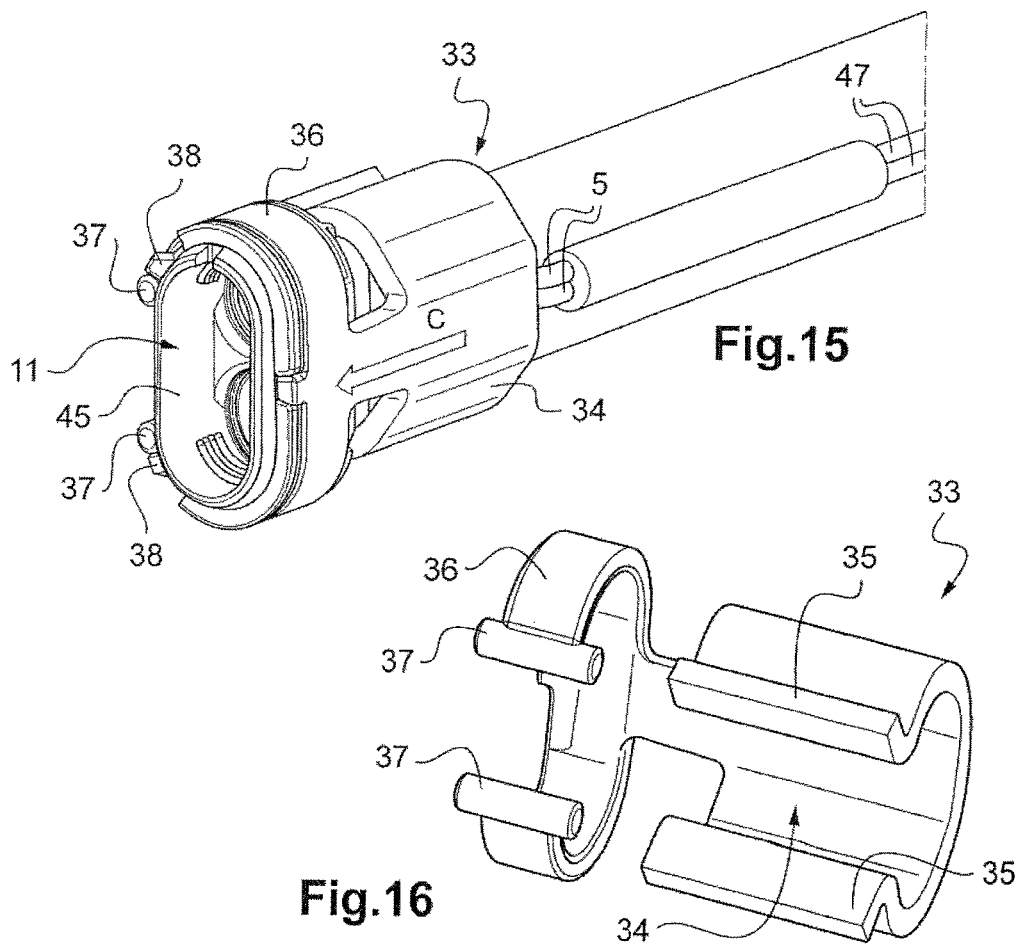
Fig.15
Fig.16

MOTOR VEHICLE WINDSCREEN WIPER WINDSCREEN WASHER LIQUID DISTRIBUTION SYSTEM

The present invention relates to a motor vehicle windscreen wiper windscreen washer liquid distribution system in which the windscreen washer liquid is heated/thawed before being sprayed onto the glazed surface of the motor vehicle.

The windscreen wiper includes one or two sprayer manifolds provided with one or more pressurized sprayer orifices or nozzles, enabling distribution of the windscreen washer liquid over the glazed surface. The nozzles are fed with windscreen washer liquid contained in a reservoir by means of a pump.

If the outdoor temperature is too low, for example below 5° C., the windscreen washer liquid is heated/thawed. To this end, the hydraulic pipes in which the windscreen washer liquid circulates are heated. Thus the windscreen washer liquid is heated and conveyed in the pipes to the sprayer manifold(s) or nozzle(s) with no obstacles in the windscreen washer liquid circulation passage.

Conventionally, the windscreen washer liquid distribution system generally includes a main hydraulic pipe connected to a windscreen washer liquid pump of the motor vehicle and two windscreen wiper secondary hydraulic pipes connected to respective sprayer manifolds of the windscreen wipers. The main hydraulic pipe is disposed under the bonnet of the motor vehicle, i.e. in the engine compartment of the motor vehicle, while the secondary hydraulic pipes of the windscreen wipers are integrated into the windscreen wiper arms and consequently are mainly disposed outside the engine compartment.

Various hydraulic connectors are provided in the windscreen washer liquid distribution system to provide the interface between the main hydraulic pipe and the secondary hydraulic pipes and also the interface of said pipes with the other components of the distribution system.

In so-called heated distribution systems, the main and/or secondary hydraulic pipes are heated but a cold zone may be created in the hydraulic pipe junction area, possibly disturbing the circulation of the windscreen washer liquid in the event of frost, or even blocking it completely.

One object of the present invention is to alleviate this disadvantage by proposing an improved windscreen washer liquid distribution system making it possible to prevent cold zones, notably at the junction between the main hydraulic pipe and the secondary hydraulic pipes, of low cost, of small overall size and that is also rugged and easy to assemble or dismantle. More generally, the invention aims to prevent cold zones at the level of the various hydraulic connectors of the windscreen washer liquid distribution system.

To this end, the present invention consists in a motor vehicle windscreen wiper windscreen washer liquid distribution system including a windscreen washer liquid distribution network having:
  at least one hydraulic pipe including at least one windscreen washer liquid circulation passage,
  at least one hydraulic connector connected to the circulation passage,
  characterized in that said distribution system further includes at least one thermally conductive member in thermal contact on the one hand with at least one hydraulic connector and on the other hand with a heating element of the distribution system.

The thermally conductive member preferably includes dedicated securing means for securing said thermally conductive member to the windscreen washer liquid distribution network. The thermally conductive member thus ensures the transfer of heat by conduction between a heating element and the hydraulic connector to heat the latter. The means for securing the thermally conductive member participate in the transfer of heat by conduction of heat in addition to their function of securing the thermally conductive member to the distribution network.

For example said thermally conductive member is formed in one piece, for example from metal or thermally conductive plastic.

In one embodiment said thermally conductive member is in contact with two opposite faces of the hydraulic connector. This accelerates the heating of the hydraulic connector by heating it from its two opposite ends. It is for example the means for securing said thermally conductive member that are in contact with two opposite faces of the hydraulic connector.

Said thermally conductive member is removable, for example.

In one embodiment the securing means include at least one clip configured to nest elastically over a hydraulic pipe of the distribution network. The clip enables the thermally conductive member to be firmly secured to the main hydraulic pipe whilst being secured simply and reversibly.

In another embodiment the securing means include at least one pair of elastic lugs forming a clamp cooperating with at least one hydraulic connector. For example the ends of the elastic lugs are conformed as caps to cooperate through elastic nesting with at least one hydraulic connector. In addition to the dedicated function of securing the thermally conductive member, the securing means optimize the heating of the hydraulic connector by transferring heat from the heating element on either side of the hydraulic connector.

For example said hydraulic connector is a branch connector that may include a check valve.

In accordance with another example, said hydraulic connector is an adapter connecting at least one circulation passage of the hydraulic pipe, for example the secondary pipe, to at least one branch connector. For example said means for securing the thermally conductive member include at least one locking hoop configured to nest elastically around the adapter and lock the connection of the adapter to the branch connector. In addition to the function of securing the thermally conductive member, the locking hoop locks the connection between the adapter and the branch connector and participates in the transfer of heat. Moreover, the hoop shape optimizes the area of exchange between the adapter and the thermally conductive member.

In accordance with another example, the hydraulic connector is a male connector enabling connection of at least one circulation passage of a hydraulic pipe to a windscreen wiper.

In accordance with another example, said thermally conductive member includes a housing receiving the heating element.

In one embodiment, said heating element is formed by heating conductors extending out of the sleeve of the hydraulic pipe. Thus heat already supplied by the heating conductors of the hydraulic pipe can be re-used to heat the hydraulic connector.

In one embodiment, said thermally conductive member includes a protuberance around which the heating conductors are wound.

In accordance with another example, it is the means for securing the thermally conductive member that are in thermal contact with the heating conductors. Heat from the heating conductors and that stored by the sleeve is thus fed to the hydraulic connector to thaw it.

In another embodiment, said heating element is an attached element, independent of the heating conductors in the hydraulic pipes. For example, said heating element includes a thermistor and said thermally conductive member includes a housing receiving the heating element. Using a heating element independent of the dedicated heating means of the hydraulic pipes makes it possible to heat the hydraulic connectors of hydraulic pipes that are not themselves heated.

A thermal interface may be disposed between said thermally conductive member and said heating element, the thermal interface preferably coating said heating element. The thermal interface promotes the exchange of heat between the heating element and the thermally conductive member and secures the heating element in position.

In a so-called "two-manifold" embodiment for windscreen wipers with two sprayer manifolds, said hydraulic pipe includes two circulation passages.

Said thermally conductive member may include a thermally conductive tongue configured to be inserted between two hydraulic connectors. For example the thermally conductive tongue is formed by two plates in thermal contact with a face of a respective hydraulic connector. For example the elastic lugs of the securing means are arranged symmetrically on either side of the thermally conductive tongue arranged at the centre. The thermally conductive tongue facilitates the transfer of heat between the two hydraulic connectors.

The thermally conductive member may include an H-shaped head configured to be inserted between two spigots of a male connector.

The invention also consists in a thermally conductive member for motor vehicle windscreen wiper windscreen washer liquid distribution systems including a windscreen washer liquid distribution network having:
- at least one hydraulic pipe including at least one windscreen washer liquid circulation passage,
- at least one hydraulic connector for connecting the circulation passage,
- characterized in that said thermally conductive member includes dedicated securing means for securing said thermally conductive member to the windscreen washer liquid distribution network, the securing means furthermore being configured so that said thermally conductive member can be brought into thermal contact with the hydraulic connector after the hydraulic connector has been connected to the circulation passage.

Figure 11:
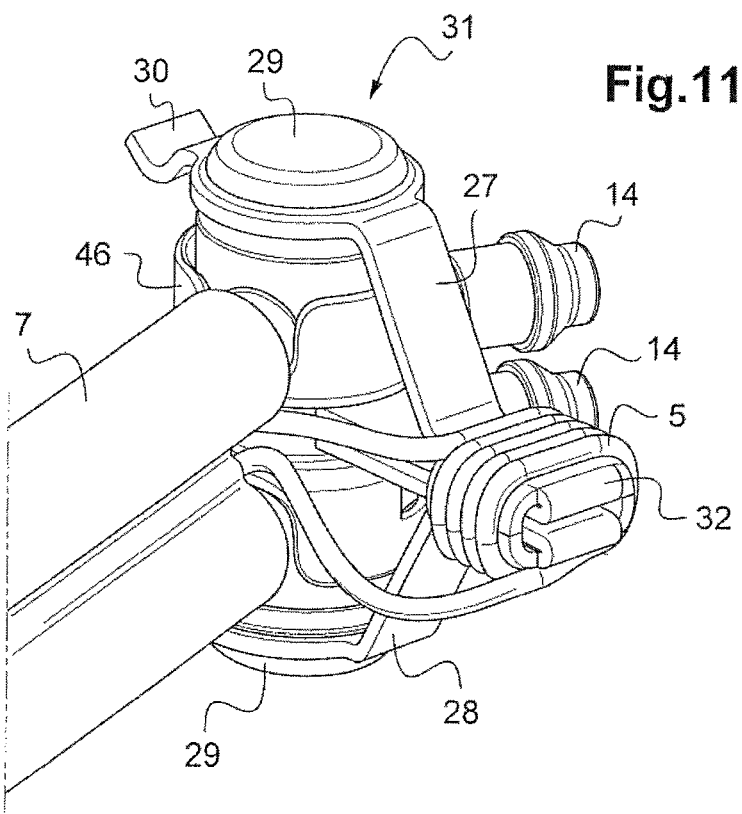
Figure 12:
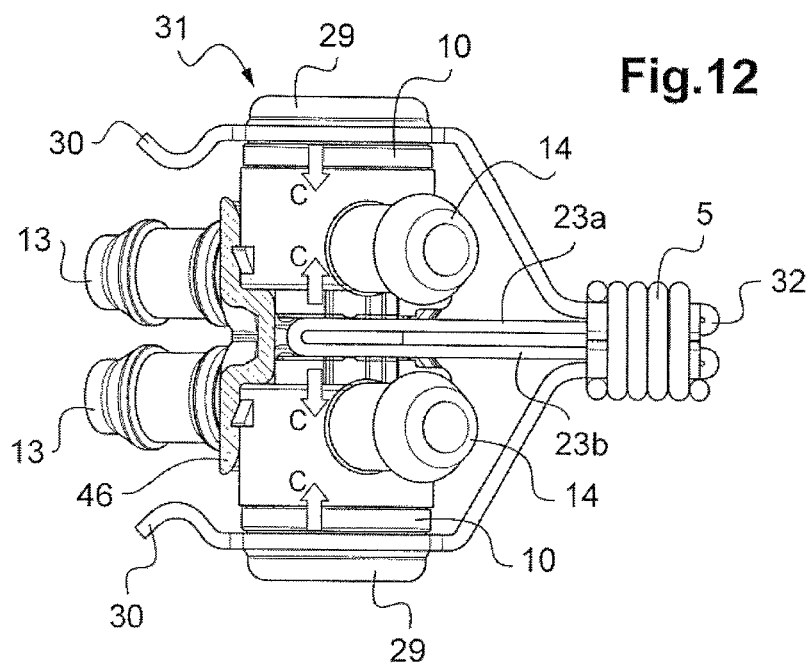
Figure 13A:
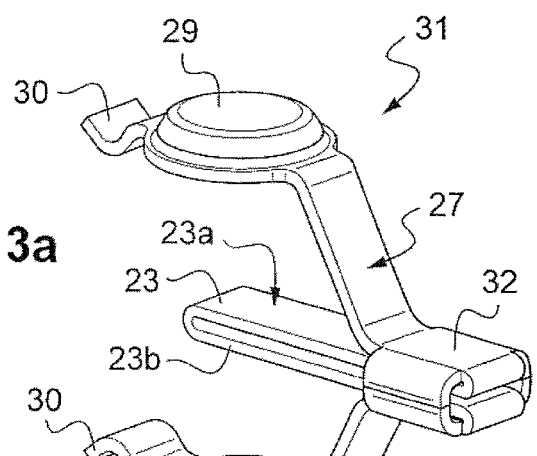
Figure 13B:
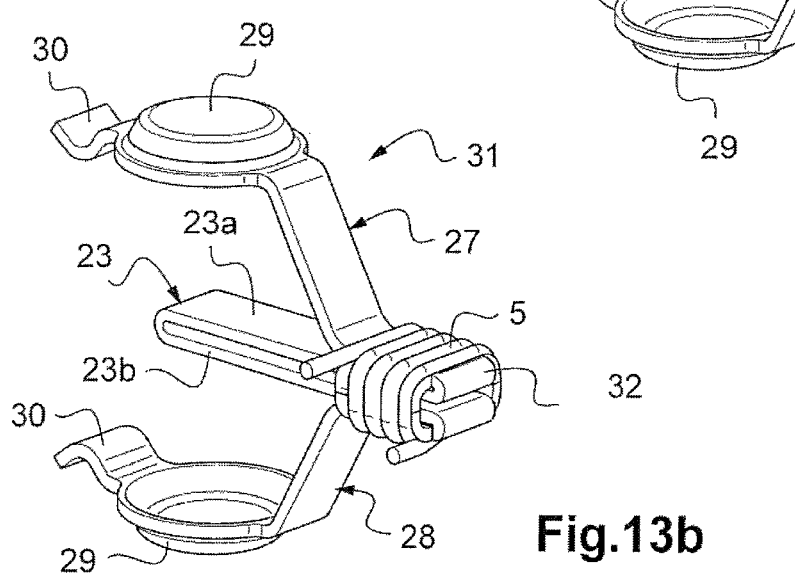
Figure 17:
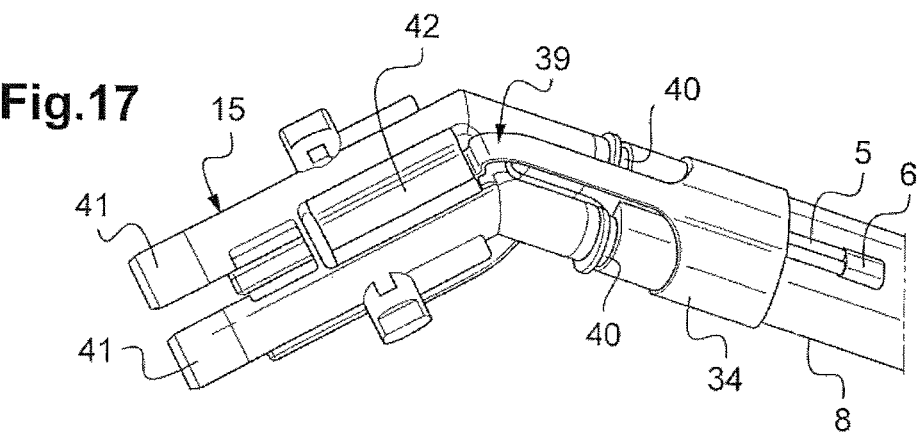
Figure 18:
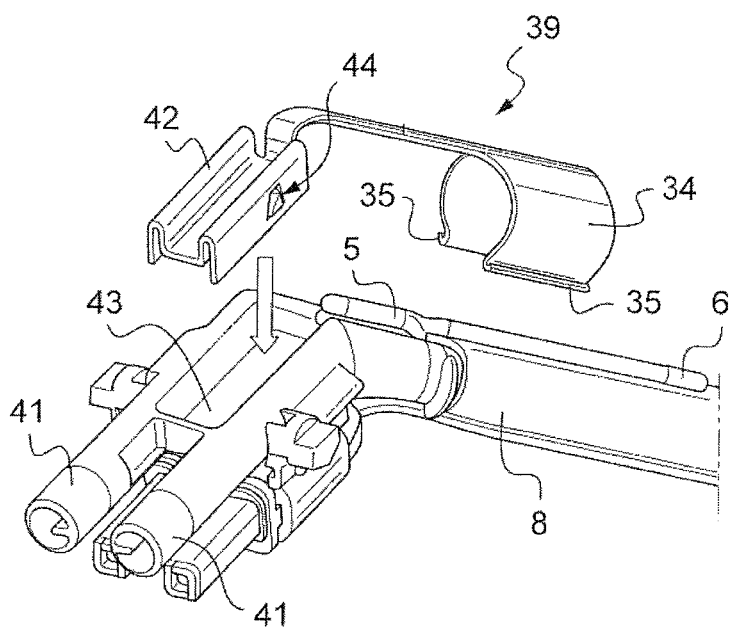
Figure 19:
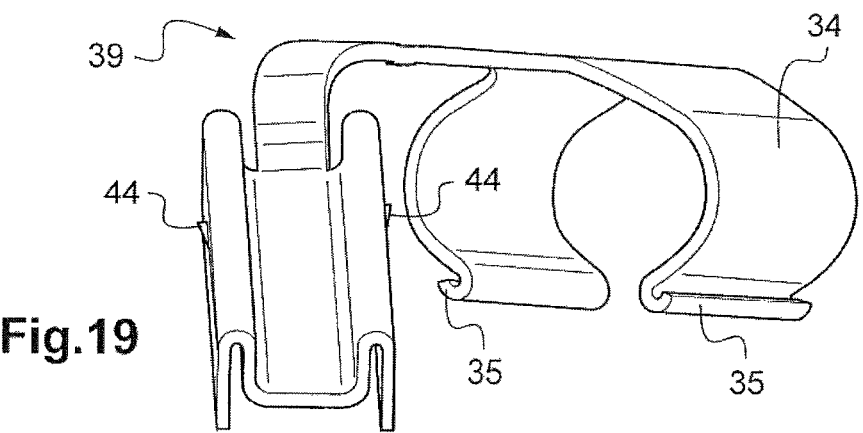

Other objects, features and advantages of the invention will emerge from the following description given by way of nonlimiting example with reference to the appended drawings, in which:

FIG. 1 represents a diagrammatic view of elements of a windscreen washer liquid distribution system for motor vehicle windscreen wipers, FIG. 2 represents one example of a main hydraulic pipe for a so-called "single-manifold" distribution system, FIG. 3 represents a diagrammatic view of elements of a windscreen washer liquid distribution system for motor vehicle windscreen wipers in accordance with a first embodiment, for a so-called "two-manifold" distribution system, FIG. 4 represents a front view of the distribution system from FIG. 3, FIG. 5 represents a perspective view of the thermally conductive member represented in FIGS. 3 and 4, FIG. 6 represents a view of the distribution system from FIG. 3 in the disassembled state, during mounting of the thermally conductive member in the distribution network, FIG. 7 represents a diagrammatic view of elements of a windscreen washer liquid distribution system for motor vehicle windscreen wipers in accordance with a second embodiment, FIG. 8 represents a front view of elements of the distribution system from FIG. 7, FIG. 9a represents a perspective view of the thermally conductive member from FIGS. 7 and 8 and of a thermistor in the process of being assembled with the thermally conductive member, FIG. 9b represents the thermally conductive member from FIG. 9a and the thermistor when assembled, FIG. 10 represents a view of the distribution system from FIG. 7 in the disassembled state, during mounting of the thermally conductive member in the distribution network, FIG. 11 represents a diagrammatic view of elements of a windscreen washer liquid distribution system for motor vehicle windscreen washers in accordance with a third embodiment, FIG. 12 represents a front view of elements of the distribution system from FIG. 11, FIG. 13a represents a perspective view of the thermally conductive member represented in FIGS. 11 and 12, FIG. 13b represents the thermally conductive member from FIG. 13a and a heating conductor of the main hydraulic pipe when assembled, FIG. 14 represents a diagrammatic view of elements of a windscreen washer liquid distribution system for motor vehicle windscreen wipers in accordance with a fourth embodiment in which the thermally conductive member is secured to the secondary hydraulic pipe and to an adapter, FIG. 15 shows a secondary hydraulic pipe of the windscreen washer liquid distribution system represented in FIG. 14 provided with an adapter and a heat conductor and detached from the other hydraulic pipes of the distribution system, FIG. 16 represents a perspective view of the thermally conductive member from FIG. 15, FIG. 17 represents a diagrammatic view of elements of a windscreen washer liquid distribution system for motor vehicle windscreen wipers in accordance with a fifth embodiment in which the thermally conductive member is secured to the secondary hydraulic pipe and to a male connector, FIG. 18 represents a view of the distribution system from FIG. 17 in the disassembled state, the thermally conductive member being vertically above a male connector, and FIG. 19 represents a perspective view of the thermally conductive member from FIG. 18.

In these figures, identical elements bear the same reference numbers.

FIG. 1 represents a diagrammatic general view of the elements of a windscreen washer liquid distribution system 1 for motor vehicle windscreen wipers 2 (only one wiper is represented in FIG. 1).

The windscreen washer liquid distribution system 1 represented is suitable for windscreen wipers with two sprayer manifolds (also known as a two-manifold distribution system) or for windscreen wipers with a single sprayer manifold (or single-manifold distribution system). Windscreen wipers with two manifolds have a sprayer manifold on each side of the windscreen wiper, each manifold extending in the longitudinal direction of the wiper. The windscreen washer liquid is therefore conveyed only to the front portion of the wiper, i.e. the windscreen washer liquid is conveyed to the sprayer manifold located on the side on which the arm of the windscreen wiper advances during an upward wiping phase and the other side during the downward wiping phase. This arrangement makes it possible to wipe the windscreen washer liquid instantaneously after its deposition on the glazed surface, thereby eliminating any interval during which the view of the driver might have been reduced at the same time as advantageously maintaining the necessary washing/cleaning performance.

The windscreen washer liquid distribution system 1 includes a windscreen washer liquid distribution network notably comprising a main hydraulic pipe 7, two secondary hydraulic pipes 8 and at least one hydraulic connector 9, 10, 11, 15.

As can be seen in an embodiment represented in FIG. 2, the main hydraulic pipe 7 of a so-called "single-manifold" distribution system includes a sleeve 3 in which at least one circulation passage 7*a* is provided for circulation of the windscreen washer liquid. The sleeve 3 is made from a flexible material, for example rubber. The circulation passage 7*a* is connected to a windscreen washer liquid pump 12 of the motor vehicle, the pump 12 itself being connected to a reservoir 4 (FIG. 1).

In the two-manifold embodiment for windscreen wipers with two sprayer manifolds, the main hydraulic pipe 7 includes two circulation passages (FIGS. 1 and 3).

The secondary hydraulic pipes 8 are of the same design (see for example FIG. 7). They respectively have at least one circulation passage and are intended to be connected to a respective windscreen wiper 2.

In operation, the windscreen washer liquid circulates from the reservoir 4 to the windscreen wipers 2 as shown by the arrows F represented in FIG. 1.

In one particular, so-called "heating" embodiment, the main hydraulic pipe 7 and/or the secondary hydraulic pipes 8 also include(s) at least one heating conductor 5, for example buried in the mass of the sleeve 3 (FIG. 2). The heating conductor 5 is inserted during extrusion of the sleeve 3, for example. The heating conductor 5 is a resistive wire that heats the sleeve 3 and therefore heats the windscreen washer liquid circulating in the circulation passage. Thus the windscreen washer liquid is heated when the outdoor temperature is too low. Moreover, given that the resistive wire is accommodated in the sleeve, it does not constitute an obstacle to the flow of the windscreen washer liquid in the circulation passage.

In the two-manifold embodiment for windscreen wipers with two sprayer manifolds, the heating conductors 5 extend in the sleeve 3 of the main hydraulic pipe 7 and/or secondary hydraulic pipe 8, for example between the two circulation passages.

The heating conductors 5 are connected to an electrical power supply, for example at the same end as the pump 12. At the other end, i.e. at the end connected to the secondary hydraulic pipes 8, the heating conductors 5 are connected together by an electrical shunt 6 to complete the electrical circuit. The shunt 6 is outside the sleeve 3 as can be seen in FIG. 6.

The hydraulic connectors of the distribution network notably include the branch connector 10, the adapter 11, the male connector 15 and the pump connector 9.

The branch connector 10 connects at least one circulation passage 7*a*, 7*b* of the main hydraulic pipe 7 to at least two circulation passages 8*a*, 8*b* of respective secondary hydraulic pipes 8, as represented in the FIG. 3 example.

The branch connector 10 is for example a T-shaped or Y-shaped tubular element enabling the windscreen washer liquid to be diverted from the main hydraulic pipe 7 to the two secondary hydraulic pipes 8. To be more precise, the branch connector 10 includes at an inlet a spigot 13 connected to a circulation passage 7*a* of the main hydraulic pipe 7 and at an outlet two spigots 14 connected to respective circulation passages 8*a* of secondary hydraulic pipes 8.

The branch connector 10 may include a check valve 110 between the inlet spigots and the outlet spigots. The check valve 110 enables the pumped liquid to flow in the circulation direction from the pump to the manifold and blocks return flow of the pumped liquid in the other direction, i.e. from the wipers to the pump. The check valve 110 thus prevents any return of liquid from the windscreen wipers to the pump, notably during a phase in which distribution of liquid in a circulation passage is stopped. The check valves 110 include a connector body of cylindrical general shape, for example. It is of course possible to use other types of hydraulic connector, without check valves, such as "T" or "Y" tubes simply enabling circulation of the windscreen washer liquid from the passages of the main hydraulic pipe 7 to the passages of the secondary hydraulic pipes 8.

In the two-manifold embodiment for windscreen wipers with two sprayer manifolds, the distribution system includes two branch connectors 10, for example stacked one above the other so that the inlet spigots 13 of the respective branch connectors 10 are stacked and substantially parallel to each other and so that the outlet spigots 14 of the respective branch connectors 10 are also stacked and substantially parallel to each other. The two branch connectors 10 are independent of each other but may be in one piece or separate (FIG. 3). When they are separate, a securing member 46 may be arranged around the two branch connectors 10 to secure them together. The securing member 46 has for example a lateral wall partially surrounding the branch connectors 10 and the shape of which includes cut-outs for the inlet and outlet spigots 13, 14 to pass through. The securing member 46 includes fixing means, such as orifices clipping over corresponding lugs carried by the branch connectors 10.

Another type of hydraulic connector is the adapter 11. The adapters 11 enable facilitated connection of at least one branch connector 10 with at least one circulation passage 8*a*, 8*b* of a secondary hydraulic pipe 8 (FIGS. 7 and 14).

Another type of hydraulic connector is the male connector (FIGS. 1 and 17). The male connector 15 enables connection of at least one circulation passage 8*a*, 8*b* of a secondary hydraulic pipe 8 to a windscreen wiper 2.

Another type of hydraulic connector is the pump connector 9 (FIG. 1).

The windscreen washer liquid distribution system 1 further includes at least one thermally conductive member 16, 22, 31, 33, 39 in thermal contact on the one hand with at least one hydraulic connector 9, 10, 11, 15 and on the other hand with a securing element 5, 6, 21 of the distribution system 1.

The member 16, 22, 31, 33, 39 is made from a thermally conductive material such as a metal or a thermally conductive plastic material. The thermally conductive member 16, 22, 31, 33, 39 is formed in one piece, for example produced by bending when it is made of metal such as sheet metal or by injection/moulding when it is made from a thermally conductive plastic material.

By "thermal contact" is meant either direct contact with no intermediary (the thermally conductive member 16, 22, 31, 33, 39 includes a first portion pressed against a surface of at least one hydraulic connector 9, 10, 11, 15 and a second portion pressed against a heating element 5, 6, 21) or contact with between the thermally conductive member 16, 22, 31, 33, 39 and the hydraulic connector 9, 10, 11, 15 and/or the heating element 5, 6, 21 a thermally conductive interface promoting the exchange of heat such as a thermally conductive resin.

The thermally conductive member 16, 22, 31, 33, 39 includes dedicated securing means adapted to be secured to the windscreen washer liquid distribution network, the securing means being configured so that the thermally conductive member 16, 22, 31, 33, 39 can be brought into thermal contact with the hydraulic connector 9, 10, 11, 15 after the hydraulic connector 9, 10, 11, 15 has been connected to the circulation passages.

Thus the thermally conductive member 16, 22, 31, 33, 39 transfers heat by conduction between a heating element 5, 6, 21 and the hydraulic connector 9, 10, 11, 15 to heat the latter. The means for securing the thermally conductive member 16, 22, 31, 33, 39 participate in the transfer of heat by conduction of heat in addition to their function of securing it to the distribution network.

FIGS. 3 to 6 represent elements of a first embodiment of the windscreen washer liquid distribution system for motor vehicle windscreen wipers.

In this first embodiment, the heating element takes the form of the heating conductors 5 of the main hydraulic pipe 7, extending out of the sleeve 3. To be more precise, the thermally conductive member 16 is in thermal contact with the heating conductors 5, bent laterally outside the sleeve 3 (FIG. 3). To be more precise, it is the securing means of said thermally conductive member 16 that are in thermal contact with the heating conductors 5, 6.

In this first embodiment, the thermally conductive member 16 is secured to the main hydraulic pipe 7.

Moreover, the thermally conductive member 16 is removable. To this end, the thermally conductive securing means constitute a clip, for example.

Accordingly, and as represented in FIG. 3, the means for securing the thermally conductive member 16 include a clip 17 configured to nest elastically over the sleeve 3 of the main hydraulic pipe 7, clamping the heating conductors 5, 6 of the main hydraulic pipe 7. The clip 17 is therefore pressed against the shunt 6 disposed outside the sleeve.

In the particular two-manifold embodiment for windscreen wipers with two sprayer manifolds represented in FIGS. 3 to 6, the clip 17 has for example the general shape of a "3", conformed to cooperate with a sleeve 3 having the general shape of an "8", espousing the tubular shapes of the two circulation passages. The clip 17 extends longitudinally in the direction L of the main hydraulic pipe 7 to increase the area of exchange with the sleeve 3 and to improve the securing to the sleeve 3.

The clip-type securing means may be associated with denesting means including at least one strip 18 for detaching the securing means. Thus the ends of the clip 17 are extended by a respective detachment strip 18 extending along the longitudinal edge to facilitate denesting of the thermally conductive member 16.

Moreover, the thermally conductive member 16 includes a thermally conductive tongue 19 configured to be inserted between the two stacked branch connectors 10, as represented in FIGS. 3 to 6.

The thermally conductive tongue 19 is for example formed of two parallel elongate plates 19*a*, 19*b* respectively conformed to be pressed against the facing upper and lower faces of the branch connectors 10. The plates 19*a*, 19*b* are joined together and to the clip 17 at one end and are for example free at the other end. The thermally conductive tongue 19 is for example connected to the clip 17 by a central extension of the clip 17 imparting to the thermally conductive member 16 the flexibility for mounting it on the network.

The securing member 46 further includes a central opening 20 for the thermally conductive tongue 19 to pass through between the two branch connectors 10 (FIG. 4).

At assembly time, the thermally conductive member 16 is brought into thermal contact with the branch connectors 10 after connection of the latter to the main hydraulic pipe 7 with which the thermally conductive member 16 is nested, as shown in FIG. 6.

Thus the thermally conductive member 16 transfers heat by conduction between the heating conductors 5, 6 of the main hydraulic pipe 7 and the branch connectors 10. The transfer of heat by conduction between the thermally conductive member 16 and the branch connectors 10 is represented by the arrows C in FIG. 4. The heat from the heating conductors 5, 6 and that stored by the sleeve 3 is thus conveyed to the branch connectors 10 to thaw them.

The particular geometry of the securing means enables effective securing of the thermally conductive member 16 to the main hydraulic pipe 7 and ensures that the heat already supplied by the heating conductors 5, 6 and the sleeve 3 of the main hydraulic pipe 7 can be re-used to heat the branch connectors 10. Moreover, the thermally conductive tongue 19 enables facilitated access of the heat to the centre of the assembly of the two branch connectors 10.

FIGS. 7, 8, 9*a*, 9*b* and 10 show a second embodiment of the distribution system.

In this second embodiment, the heating element is an element separate from the elements of the distribution network. For example, the heating element includes a thermistor 21 for example of the PTC (Positive Temperature Coefficient) type.

In this second embodiment, the securing means secure the thermally conductive member 22 to the hydraulic connector of the distribution network.

Moreover, the thermally conductive member 22 is in contact with two opposite faces of the hydraulic connector.

It is for example the securing means of the thermally conductive member 22 that are in contact with two opposite faces of the hydraulic connector.

The securing means include for example at least one pair of elastic lugs forming a clamp cooperating with at least one hydraulic connector. For example, the ends of the elastic lugs are conformed as caps to cooperate through elastic nesting with at least one hydraulic connector.

In the two-manifold embodiment for windscreen wipers with two sprayer manifolds shown in FIGS. 7 to 10, the securing means thus include a pair of elastic lugs 27, 28 forming a clamp cooperating with two stacked branch connectors 10. A cap 29 of an elastic lug 27 cooperates through elastic nesting with a first branch connector 10. The cap 29 of the second elastic lug 28 cooperates with the second branch connector 10. The caps 29 are thus disk-shaped and are substantially parallel to each other and parallel to the plates 23*a*, 23*b* of the thermally conductive tongue 23.

The retaining means may be associated with denesting means including at least one strip 30 for detaching the securing means.

The thermally conductive member 22 also includes a thermally conductive tongue 23 configured to be inserted between the two branch connectors 10 (FIG. 8). The thermally conductive tongue 23 is for example disposed at the centre, between the two elastic lugs 27, 28 arranged symmetrically on either side of the thermally conductive tongue 23.

As before, the thermally conductive tongue 23 is for example formed by two parallel elongate plates 23a, 23b respectively conformed to be pressed against the facing lower and upper faces of the branch connectors 10.

In this example, the plates 23a, 23b are connected to each other at a first end and are connected to the securing means at the opposite end by a frame forming an opening 24 between the plates 23a, 23b receiving the heating element (FIGS. 9a and 9b). The housing delimited in this way by the plates 23a, 23b of the thermally conductive tongue 23 and by the opening 24 receives a thermal interface 25, such as a thermally conductive resin (FIG. 9b), coating the thermistor 21 and in contact with the internal walls of the housing. The thermal interface 25 promotes the exchange of heat between the thermistor 21 and the thermally conductive tongue 23 and secures the thermistor 21 in position in the housing. The thermally conductive resin is for example poured into the housing of the thermally conductive tongue 23 after fitting the thermistor 21 and leaving the power supply wires 26 of the thermistor apparent so as to enable their connection (FIG. 10).

At assembly time, the thermally conductive member 22 is placed in thermal contact with the branch connectors 10 after connection of the latter to the hydraulic pipes 7, 8 as shown in FIG. 10.

The thermally conductive member 22 thus transfers heat by conduction between the thermistor 21 and the branch connectors 10. The transfer of heat by conduction between the thermally conductive member 22 and the branch connectors 10 is represented by the arrows C in FIG. 8. The thermally conductive member 22 transfers heat from the thermistor 21 on either side of the branch connectors 10 to thaw them at their ends thanks to the particular geometry of the securing means, as well as between the branch connectors 10 thanks to the thermally conductive tongue 23. Using a heating element independent of the dedicated heating means of the hydraulic pipes 7, 8 makes it possible to heat hydraulic connectors of hydraulic pipes that are not themselves heated.

FIGS. 11, 12, 13a and 13b show a third embodiment of the distribution system.

In this third embodiment, the heating element is formed by the heating conductors 5 extending out of the sleeve 3.

As before, the thermally conductive member 31 includes a thermally conductive tongue 23 and the securing means include a pair of elastic lugs 27, 28 similar to the second embodiment for securing them to at least one hydraulic connector.

In this third embodiment, the thermally conductive member 31 includes a protuberance 32 on the back of the thermally conductive tongue 23 around which the heating conductors 5 of the main hydraulic pipe 7 are wound to form one or more turns, as shown in FIGS. 13a and 13b. The assembly formed by the heating conductors 5 wound around the protuberance 32 may be encapsulated in a thermal interface, such as a thermally conductive resin, to protect them and to improve thermal conductivity.

At assembly time, the thermally conductive member 31 is brought into thermal contact with the branch connectors 10 after connection of the latter to the main hydraulic pipe 7 from which the heating conductors 5 extend, as shown in FIG. 11.

The securing means thus participate in the transfer of heat between the branch connectors 10 and the heating element 5 as well as simply and reversibly securing the thermally conductive member 31.

The transfer of heat by conduction between the thermally conductive member 31 and the branch connectors 10 is represented by the arrow C in FIG. 12. The thermally conductive member 31 transfers heat from the heating conductors 5 on either side of the branch connectors 10 to thaw them at their ends thanks to the particular geometry of the securing means, as well as between the branch connectors 10 thanks to the thermally conductive tongue 23. The heat already supplied by the heating conductors 5 of the main hydraulic pipes 7 can be re-used to heat the branch connectors 10.

FIGS. 14 to 16 show a fourth embodiment of the distribution system.

In this fourth embodiment, the heating element is formed by the heating conductors 5 of the secondary hydraulic pipe 8, extending out of the sleeve to be connected to cables 47 of an electrical power supply (FIG. 15). It is one of the means for securing the thermally conductive member 33 that is in thermal contact with the heating conductors 5.

In this fourth embodiment, the thermally conductive member 33 is secured on the one hand to the secondary hydraulic pipe 8 and on the other hand to a hydraulic connector formed by an adapter 11.

The adapter 11 includes at its outlet at least one, spigot conformed to be inserted into a circulation passage of a secondary hydraulic pipe 8 and at its inlet an inlet housing 45 cooperating with a spigot 14 of a branch connector 10. The adapter 11 thus improves the seal of the connection between the branch connector 10 and the secondary hydraulic pipes 8 and provides tactile feedback perceptible by the operative guaranteeing correct mounting.

Thus the distribution system includes two thermally conductive members 33, one on each adapter 11.

The thermally conductive member 33 is for example clipped on. Accordingly, and as shown in FIG. 14, the securing means include a clip 34 configured to nest elastically over the sleeve 3 of the secondary hydraulic pipe 8 and to clamp the heating conductors 5 of the secondary hydraulic pipe 8.

The clip 34 is generally substantially C-shaped, for example, and conformed to cooperate with a generally O-shaped sleeve 3. The clip 34 extends longitudinally in the direction L of the secondary hydraulic pipe 8 to increase the area of exchange with the sleeve 3 and improve the securing to the sleeve 3.

The clip-on securing means may be associated with denesting means including at least one strip 35 for detaching the securing means.

Moreover, the securing means include a locking hoop 36 configured to nest elastically around the adapter 11. To be more precise, the locking hoop 36 is nested around the exterior walls of the inlet housing 45. In addition to the dedicated function of securing the thermally conductive member 33 and the function of heat transfer, the locking hoop 36 locks the connection between the adapter 11 and the branch connector 10. Moreover, the hoop shape optimizes the area of exchange between the adapter 11 and the thermally conductive member 33.

The ends of the locking hoop 36 include a roller 37 cooperating clip-fashion with complementary lugs 38 carried by the adapter 11 to ensure correct mounting through a stable position of the locking hoop 36.

The clip 34 and the locking hoop 36 are connected by a strip of the thermally conductive member 33 locally thinning the thermally conductive member 33 and thus facilitating the mounting of the thermally conductive member 33 on the network.

At assembly time, the thermally conductive member 33 is brought into thermal contact with the adapters 11 after connection of the latter to the branch connectors 10.

Thus the thermally conductive member 33 transfers heat by conduction between the heating conductors 5 and the adapter 11 (arrow C in FIG. 15). The heat from the heating conductors 5 and that stored by the sleeve 3 is recovered by the clip 34 to be transmitted to the adapter 11 via the locking hoop 36.

FIGS. 17 to 19 show a fifth embodiment of the distribution system.

In this fifth embodiment, the heating element is formed by the heating conductors 5 of the secondary hydraulic pipe 8, extending out of the sleeve 3. To be more precise, the thermally conductive member 39 is in thermal contact with the heating conductors 5, 6 bent laterally outside the sleeve 3 (FIG. 17). It is the securing means of the thermally conductive member 39 that are in thermal contact with the heating conductors 5, 6.

In this fifth embodiment, the securing means cooperate with the secondary hydraulic pipe 8 to secure the thermally conductive member 39. Thus the distribution system includes two thermally conductive members 39, one on each secondary hydraulic pipe 8.

The securing means of the thermally conductive member 39 constitute a clip for example. Accordingly, and as shown in FIG. 18, the securing means include a clip 34 configured to nest elastically over the sleeve 3 of the secondary hydraulic pipe 8 and clamp the heating conductors 5, 6 of the secondary hydraulic pipe 8. The clip 34 is substantially generally C-shaped for example, with a strip 35 for detaching the securing means.

Moreover, the hydraulic connector is formed by a male connector 15.

The male connector 15 includes at least one spigot for circulation of the windscreen washer liquid, the inlet 40 of which is inserted into a circulation passage of a secondary hydraulic pipe 8 and the outlet 41 of which is inserted in a complementary liquid female connector of the windscreen wiper (not shown). The spigot may be cranked.

In the two-manifold embodiment for windscreen wipers with two sprayer manifolds, the male connector 15 includes two spigots arranged side by side and connected transversely (FIGS. 17 and 18).

In the heated embodiment, the male connector 15 may be heated, for example by the heating conductors 5 extending out of the sleeve 3 of the secondary hydraulic pipes 8.

The thermally conductive member 39 furthermore includes a head 42 with an H-shaped cross section. The head 42 is configured to be inserted in a complementary cavity 43 of the male connector 15 between the spigots. When the head 42 has been inserted in the cavity 43, the sides of the H-shaped head 42 are in thermal contact with a lateral wall of a respective spigot.

The head 42 includes clamping means 44, such as a claw, arranged on each flange of the H-shape, cooperating with the edges of the cavity 43 of the male connector 15 for reliable insertion of the head 42 in the cavity 43.

The head 42 and the clip 34 are assembled by a strip of the thermally conductive member 39 locally thinning the thermally conductive member 39 to allow deformation between the clip 34 and the heed 42, thus facilitating mounting of the thermally conductive member 39 on the network.

At assembly time, the thermally conductive member 39 is brought into thermal contact with the male connector 15 after the connection of the latter to the circulation passages of the secondary hydraulic pipe 8 (FIG. 18).

The securing means thus participate in the transfer of heat as well as simply and reversibly fixing the thermally conductive member 39. The thermally conductive member 39 thus transfers heat by conduction between the heating conductors 5, 6 and the male connector 15. The heat from the heating conductors 5, 6 and that stored by the sleeve 3 is recovered by the clip 34 to heat the male connector 15.

The invention claimed is:

1. A motor vehicle windscreen wiper windscreen washer liquid distribution system, comprising:
   a windscreen washer liquid distribution network having:
      at least one hydraulic pipe including at least one windscreen washer liquid circulation passage;
      at least one hydraulic connector connected to the circulation passage; and
      at least one thermally conductive member in thermal contact with the at least one hydraulic connector and with a heating element of the distribution system,
      wherein said thermally conductive member is removable and includes a securing means that secures the thermally conductive member to the windscreen washer liquid distribution network,
      wherein the securing means includes at least one pair of elastic lugs forming a clamp cooperating with at least one hydraulic connector, and
      wherein at one end of each of the elastic lugs a cap is formed, and wherein the caps are substantially parallel to each other and cooperate through elastic nesting with two opposite faces of the hydraulic connector.

2. The distribution system according to claim 1, wherein said thermally conductive member includes the securing means that secures said thermally conductive member to the windscreen washer liquid distribution network.

3. The distribution system according to claim 1, wherein said thermally conductive member is formed in one piece.

4. The distribution system according to claim 1, wherein said thermally conductive member is in contact with two opposite faces of the hydraulic connector.

5. The distribution system according to claim 1, wherein the hydraulic connector is a male connector enabling connection of at least one circulation passage of a hydraulic pipe to a windscreen wiper.

6. The distribution system according to claim 1, wherein said thermally conductive member includes a housing receiving the heating element.

7. The distribution system according to claim 1, wherein said heating element is formed by heating conductors extending out of a sleeve of the at least one hydraulic pipe.

8. The distribution system according to claim 7, wherein said thermally conductive member includes a protuberance around which the heating conductors are wound.

9. The distribution system according to claim 7, wherein the means for securing the thermally conductive member are in thermal contact with the heating conductors.

10. The distribution system according to claim 1, further comprising a thermal interface disposed between said thermally conductive member and said heating element, the thermal interface preferably coating said heating element.

11. The distribution system according to claim 1, wherein said hydraulic pipe includes two circulation passages.

12. The distribution system according to claim 1, wherein said hydraulic connector is a branch connector.

13. The distribution system according to claim 12, wherein the hydraulic connector includes a check valve.

14. A motor vehicle windscreen wiper windscreen washer liquid distribution system comprising:
   a windscreen washer liquid distribution network having:
      at least one hydraulic pipe including at least one windscreen washer liquid circulation passage;
      at least one hydraulic connector connected to the circulation passage; and
      at least one thermally conductive member in thermal contact with the at least one hydraulic connector and with a heating element of the distribution system,
   wherein said hydraulic pipe includes two circulation passages, and
   wherein said thermally conductive member includes a thermally conductive tongue configured to be inserted between two hydraulic connectors.

15. The distribution system according to claim 14, wherein the thermally conductive tongue is formed by two plates in thermal contact with a face of a respective hydraulic connector.

16. The distribution system according to claim 15, wherein a pair of elastic lugs of a securing means are arranged symmetrically on either side of the thermally conductive tongue arranged at the centre.

17. The distribution system according to claim 14, wherein a securing means include at least one clip configured to nest elastically over a hydraulic pipe of the distribution network.

18. A thermally conductive member for motor vehicle windscreen wiper windscreen washer liquid distribution systems, comprising:
   a windscreen washer liquid distribution network having:
      at least one hydraulic pipe including at least one windscreen washer liquid circulation passage;
      at least one hydraulic connector for connecting the circulation passage, wherein the thermally conductive member is in thermal contact with at least one hydraulic connector and with a heating element of the distribution system; and
   securing means for removably securing said thermally conductive member to the windscreen washer liquid distribution network,
   wherein the securing means include at least one pair of elastic lugs forming a clamp cooperating with at least one hydraulic connector, and
   wherein at one end of each of the elastic lugs a cap is formed, and wherein the caps are substantially parallel to each other and cooperate through elastic nesting with two opposite faces of the hydraulic connector.

* * * * *